M. T. GLIMSDAL.
Grain Drill.
No. 34,830.
2 Sheets—Sheet 1.
Patented April 1, 1862.
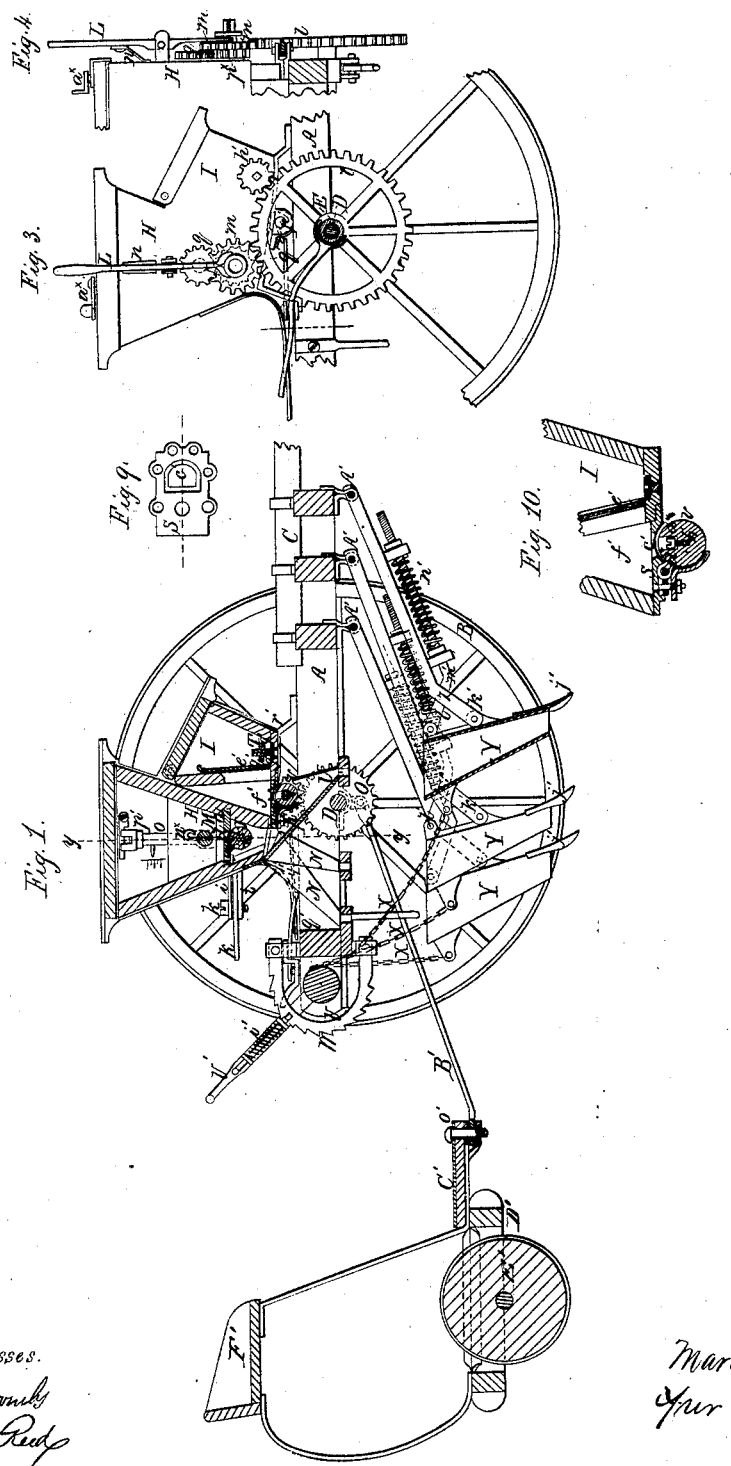
Witnesses.
Inventor.
Martin T. Glimsdal
per Munn & Co.
Attorneys.

2 Sheets—Sheet 2.
M. T. GLIMSDAL.
Grain Drill.
No. 34,830.
Patented April 1, 1862.
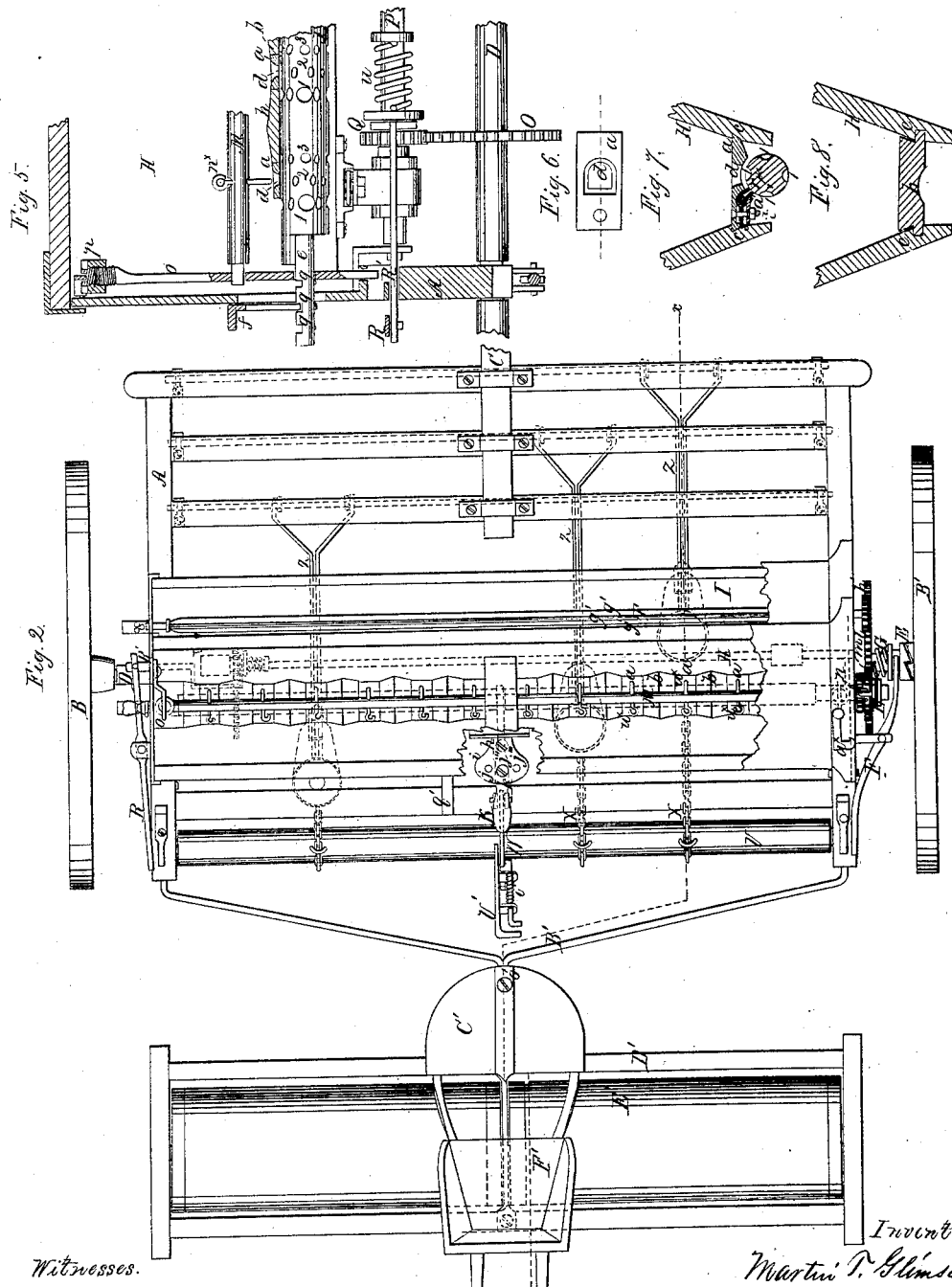
Witnesses.
Inventor.
Martin T. Glimsdal
per Munn & Co.
Attorneys.

UNITED STATES PATENT OFFICE.

MARTIN T. GLIMSDAL, OF MADISON, WISCONSIN.

IMPROVEMENT IN SEEDING-MACHINES.

Specification forming part of Letters Patent No. 34,830, dated April 1, 1862.

*To all whom it may concern:*

Be it known that I, MARTIN T. GLIMSDAL, of Madison, in the county of Dane and State of Wisconsin, have invented a new and Improved Seeding-Machine; and I do hereby declare that the following is a full, clear, and exact description of the same, reference being had to the accompanying drawings, making a part of this specification, in which—

Figure 1 is a side sectional view of my invention, taken in the line $xx$, Fig. 2; Fig. 2, a plan or top view of the same; Fig. 3, an end view of the same in elevation; Fig. 4, a back view of the parts shown in Fig. 3; Fig. 5, a longitudinal vertical section of a part of the invention, taken in the line $yy$, Fig. 1; Figs. 6, 7, 8, 9, and 10, detached views of parts pertaining to the invention.

Similar letters of reference indicate corresponding parts in the several figures.

The object of this invention is to obtain a machine which will sow or plant various kinds of seeds, and either in drills or in hills in check-rows, as may be required, and the machine at the same time be simple in construction and capable of being readily manipulated by the driver or attendant.

To enable those skilled in the art to fully understand and construct my invention, I will proceed to describe it.

A represents a rectangular frame, which is mounted on two wheels, B B', and is provided with a draft-pole, C. The wheels B B' are placed loosely on their axle D; but one of them, B', may be connected with its axle when required by means of a clutch, E, (shown in Figs. 2 and 3,) the clutch being operated by a lever, F, and a spiral spring, G, both of which are shown in Fig. 2.

On the frame A there are two seed-boxes, H I, which extend the whole width of the frame A, and are placed one directly in front of the other, and both secured permanently to the frame. The bottom of the seed-box H is formed of a series of transverse plates, $a$, and blocks $b$, the ends of which are fitted in grooves $c$ in the front and back sides of the seed-box, as shown in Figs. 7 and 8. The plates $a$ and blocks $b$ are placed alternately in position, as shown in Figs. 2 and 5, and the upper surfaces of the blocks $b$ have a double pitch or incline, the surfaces inclining downward each side the center, as shown in Fig. 5. The plates $a$ are each perforated with a hole, $d$. (See Fig. 5.)

Directly below the bottom of the seed-box H there is a shaft, J, the journals $ee$ of which are allowed to slide in their bearings. This shaft J has holes 1 2 3 made in it circumferentially in rows, as shown clearly in Fig. 5. The holes of the several rows differ in size, and any one of the rows by adjusting the shaft J longitudinally may be brought in line with the holes $d$ of the plates $a$, the shaft J being retained in any of its three positions by means of a slide, $f$, placed at one end of the seed-box H, and which may be fitted in any one of three notches, $g$, in one of the journals of said shaft. (See Fig. 5.) The shaft J is moved or adjusted by a lever, K, which has its fulcrum $h$ in plates $ii$, which are perforated with three holes. $j\ j'\ j''$, through any of which and the lever K a pin, $k$, passes. These holes serve as indicators, and enable the driver or attendant to adjust the shaft J, as may be necessary in order to sow properly the kind of seed in the box H. The shaft J is rotated from the axle D by means of a toothed wheel, $l$, on the axle, and a pinion, $m$, on the end of shaft J, the latter being allowed to slide in the pinion and connected to it by a feather and groove, so that the pinion when in gear with wheel $l$ may rotate the shaft. The pinion $m$ has a lever, L, connected to it, which lever is attached to the end of box H, and has a spring, $n$, acting against it, the spring having a tendency to keep the pinion $m$ in gear with wheel $l$.

Within the seed-box H there is placed longitudinally a seed-agitating shaft, M, which has wires or rods $n^x$ passing transversely through it at equal distances apart, a wire or rod, $n^x$, being directly over each plate $a$. The wires or rods $n^x$ are fitted loosely in the shaft M, and bent in the form of a loop at each end, so that they may be retained in the shaft. The ends of the shafts M J are fitted in vertical rods $o$, the upper ends of which have screw-threads cut on them, and are fitted in nuts $p$, attached to the inner sides of the ends of the seed-box H. (See Fig. 5.) By turning the rods $o$ the shafts J M may be adjusted higher or lower, and the flow or discharge of seed increased or diminished, as may be desired. The shaft M is rotated by pinions $p^\times$ $q$, the former being attached to the inner side of the pinion $m$ and the latter fitted in one end of shaft M. Both shafts J M may be stopped when desired by throwing the pinions $m$ out of gear with the wheel $l$, which is done by means of lever L, the latter being retained in the position to effect such result by a catch, $a^\times$, on the lid of the seed-box H.

Each plate $a$ of the bottom of the seed-box H has a cut-off brush, $r$, attached to its under side. These brushes are each formed by having their bristles pass through perforations in a plate, $s$, which is secured to the under side of its plate $a$ adjoining its hole $d$ and between plate $a$ and a plate, $a'$, by a screw-bolt, $t$. (See Fig. 7.) This arrangement admits of the adjustment of the brushes so that wear may be compensated for whenever necessary. The cut-off brushes are placed in contact with the shaft J, and operate precisely the same as usual, the shaft J rotating in the direction indicated by the arrow shown in Fig. 7. Directly under each plate $a$ there is a seed-tube, N.

On the axle D, Fig. 5, there is a toothed wheel, O, and in the frame A, above said axle, there is a shaft, P, which is parallel with the axle D, and has a sliding pinion, Q, on it, against which a spiral spring, $u$, bears. A lever, R, is connected with the pinion Q by means of an arm, R'. The spring $u$ has a tendency to keep the pinion Q in gear with the wheel O, and by operating the lever R said pinion may be thrown out of gear with the wheel O.

On the shaft P there are placed two cylinders, $v\ v$, in each of which a hole, $a''$, is made radially, in the bottom of which a screw, $b'$, is placed, by turning which the capacity of the holes may be varied as desired. (See Fig. 10.) The cylinders $v\ v$ work underneath plates S, which are provided each with a hole, $c'$, and a cut-off brush, $d'$, the latter being attached to the plates S in precisely the same way as the brushes $r$ are attached to their plates $a$.

The seed-box I contains the seed that is to be distributed by the cylinders $v\ v$. The back of this seed-box is provided with two slides, $e'\ e'$, which, when raised, admit the seed into recesses or chambers $f'\ f'$, the bottoms of which are formed by the plates S.

Within the seed-box I there is placed longitudinally a shaft, T, the journals of which have their bearings in the ends of the box. This shaft T has four radial wings or blades, $g'$, attached as shown in Figs. 1 and 2, and at the end of one of the journals of the shaft there is a pinion, $h'$, which gears into the wheel $l$. (See Fig. 3.)

Directly below the cylinder $v\ v$ of the shaft D there are seed-tubes U, and at the back part of the frame A there is placed a shaft, V, which has an arm, V', attached to it, said arm having a spring-catch, $i'$, connected to it, which engages with a notched segment, W, attached to the frame A. This spring-catch and notched segment retain the shaft V in any desired position, and to said shaft a series of chains, X, are attached, the lower ends of which are connected to tubes Y, which have teeth or furrow-shares $j'$ at their lower ends, as shown in Fig. 1. The tubes Y are connected by pivots $k'$ to the back ends of rods Z, the front ends of which are fitted loosely on rods A' at the front part of the frame A, and the upper ends of the tubes V are connected by pivots $b'$ to bars $m'$, on which spiral springs $n'$ are placed, said springs being between two eyes on the rods Z, through which eyes the bars $m'$ work. By adjusting the shaft V the tubes Y may be elevated entirely above the ground or be made to penetrate more or less deeply therein. The tubes Y conduct the seed to the ground from the tubes N U. The springs $n'$ admit of the tubes Y yielding or giving in case they meet with any obstruction in the ground, and thereby prevent the tubes or any of their parts being broken or injured by such cause. When the tubes Y are made to yield or give in consequence of meeting with an obstruction the springs $n'$ are compressed instead of being stretched or distended, and consequently they cannot be injured by over-tension.

To the back part of the frame A there is attached a draft-rod, B', the form of which is shown clearly in Fig. 2. This draft-rod is connected by a pin, $o'$, to a draw-head, C', at the front end of a rectangular frame, D', in which a roller, E', formed of two parts, is placed. The driver's seat F' is on the frame D'. By this arrangement the roller E', is allowed to conform to the irregularities of the surface of the ground independently of the frame A of the machine.

On the shaft P there is secured a projection, $p'$, and this projection acts against a spring-rod, $q'$, which is attached to the back part of the seed-box H. The back end of the rod $q'$ acts or bears against the back part of the frame A at every revolution of the shaft P, and indicates or makes known to the driver each revolution of the shaft P, and enables him in consequence to have the seed planted in hills or check-rows. This latter planting is effected by the cylinders $v\ v$, the shaft T forcing the seed through the holes covered by the slides $e'$. When these cylinders are in operation the shafts J M are stationary, the pinion $m$ being then out of gear with wheel $l$. When the shafts J M are used the shaft P is stationary, the pinion Q of said shaft being thrown out of gear with wheel O on the axle D.

I would remark that the bottom of the seed-box I may be perforated and covered by a slide, $r'$, so that said box by closing slides $e'$ and removing slide $r'$ may be used for sowing small seeds broadcast.

Having thus described my invention, what I claim as new, and desire to secure by Letters Patent, is—

1. The combination of the plates $a$ and blocks $b$, fitted in the seed-box H, as shown, in connection with the rotating shaft M, provided with loose transverse rods $n^x$, and placed within the seed-box H, and the adjustable rotating seed-distributing shaft J, provided with a series of circumferential rows of holes 1 2 3, all arranged for joint operation, as set forth.

2. Attaching the roller E' to the frame A by means of the draft-rod B', pin $o'$, and draw-head C', as shown, for the purpose of allowing the roller an adjusting movement independent of the frame A, as specified.

MARTIN T. GLIMSDAL.

Witnesses:
 H. L. FOSTER,
 JACOB SEEMANN.